United States Patent
Kwon

[11] Patent Number: 5,916,655
[45] Date of Patent: *Jun. 29, 1999

[54] DISK SUBSTRATE

[75] Inventor: Oh-Hun Kwon, Westboro, Mass.

[73] Assignee: Saint-Gobain/Norton Industrial Ceramics Corporation, Worcester, Mass.

[*] Notice: This patent is subject to a terminal disclaimer.

[21] Appl. No.: 08/722,183
[22] PCT Filed: Apr. 18, 1995
[86] PCT No.: PCT/US95/04325
§ 371 Date: Oct. 16, 1996
§ 102(e) Date: Oct. 16, 1996
[87] PCT Pub. No.: WO95/28703
PCT Pub. Date: Oct. 26, 1995

[51] Int. Cl.$^6$ .................................... B32B 3/00; G11B 5/82
[52] U.S. Cl. ................ 428/64.1; 428/65.3; 428/694 SG; 428/141; 427/129; 216/52
[58] Field of Search ....................................... 369/272, 283, 369/288; 428/694 TR, 694 BR, 694 ST, 694 SG, 64.1, 64.2, 65.3, 65.6; 216/52, 90; 501/134; 427/129; 451/63

[56] References Cited

U.S. PATENT DOCUMENTS

| | | | |
|---|---|---|---|
| 4,738,885 | 4/1988 | Matsumoto et al. | 428/64 |
| 5,060,097 | 10/1991 | Higuchi et al. | 360/103 |
| 5,432,016 | 7/1995 | Wada et al. | 428/692 |
| 5,476,821 | 12/1995 | Beall | 501/10 |
| 5,648,303 | 7/1997 | Nakamura | 501/87 |
| 5,750,230 | 5/1998 | Ishikawa et al. | 428/65.3 |

FOREIGN PATENT DOCUMENTS

131895A1  1/1985  European Pat. Off. .
62-78715  4/1987  Japan .

OTHER PUBLICATIONS

O. O. Ajayi and K. C. Ludema, "Surface Damage Of Structural Ceramics: Implications For Wear Modeling", Wear, 124 (1988), Netherlands, pp. 237–257.

D. C. Zipperian, S. Chanat and A. Trujillo, "Ceramic Microstructural Analysis For Quality Control", American Ceramic Society Bulletin, vol. 71, Jul., 1992.

Primary Examiner—Stevan A. Resan
Attorney, Agent, or Firm—Thomas M. DiMauro

[57] ABSTRACT

The present invention relates to a highly smooth zirconia-containing disk substrate produced by polishing a defect-free surface with fine diamond and/or alumina.

9 Claims, 1 Drawing Sheet

DISK SUBSTRATE

BACKGROUND OF THE INVENTION

In the information systems presently used in computers and word processors, data (i.e., programs and files) are stored and retrieved through the disk drive. The disk drive typically has three components: the read-write head ("head"), the actuator arm, and the hard magnetic disk ("disk"). In the conventional disk drive the actuator arm moves the head over the disk so that the circuitry on the head can magnetically transmit bits of information between leads and the disk. FIG. 1 discloses a conventional disk wherein a substrate 5 (typically an Al/Mg alloy) has deposited thereon, consecutively, an electroless or anodized coating (Ni/P) 6, a magnetic coating 7, a protective overcoat 8, and a liquid lubricant 9.

Due to the high density of information typically stored on a disk, the head must come very close to the disk during data transmission in order to insure accurate transfer. Accordingly, the space between the head and the disk (called a "flying height" or "air gap") is often between about 100–150 nm (4–6 microinches). At such extremely small distances, both the head and the disk must be very flat. Thus, the material used for the disk should be very stiff and amenable to a fine finish.

When the disk and actuator arm move relative to each other, an air flow develops and allows the head to "float" above the disk. During operation, the head's ability to float prevents wear-inducing contact between the head and disk which degrades the accuracy of data transfer. However, the starting and stopping of the disk or arm often produces physical contact between the head and disk. Therefore, it is also desirable to make the disk substrate from a material which is wear resistant.

As noted above, most conventional disks are made from a Mg/Al alloy overcoated with Ni/P and a magnetic film. This alloy has been selected as the material of choice for the disk due to its superior wear resistance, stiffness and polishablity, and performs well in the current relatively large disk drives.

However, increasing speed and capacity requirements are forcing disk drives to become smaller and smaller. For example, the current hard disk is about 65–275 mm in diameter and 0.64 mm to 1.5 mm in thickness, and is expected to be less than about 38 mm in diameter and less than about 0.4 mm in thickness in the future. Likewise, the air gap will be reduced to no more than 50 nm (2 microinches). At these dimensions, it is believed that use of Al/Mg alloys as disk substrates will be problematic in that the elastic modulus of Al/Mg alloys (only about 80 GPa) will not provide the stiffness required in the thin disks of the future (wherein the required stiffness will likely be at least about 200 GPa).

Faced with this problem, the art has considered using alternative ceramics. It has been suggested that glass, glass ceramics, amorphous carbon, silicon, titanium, polymers, and stainless steels are the likely candidates for the next generation of disk substrates. See B. Bhusan, "Magnetic Slider/Rigid Disk Substrate Materials and Disk Texturing Techniques-Status and Future Outlook", Advances in Information Storage Systems, Vol. 5, 1993, pp. 175–209. Moreover, Bhusan concludes that, of this group, the most promising are glasses, glass ceramics and amorphous carbon because they possess adequate elastic modulus.

One other material which has been suggested for use as a substrate for future disks is CVD silicon carbide. See *Am. Cer. Soc. Bull.* Vol. 72, No. 3 (March 1993), p.74. However, CVD silicon carbide suffers from the disadvantages of high cost and directional (columnar) grain structure.

JP 62078716 discloses a zirconia based magnetic disk substrate for use in disk drives. However, the surface roughness (Ra) of this material is reported to be only 0.01 um (100 angstroms). JP 62078715 discloses a zirconia based magnetic disk substrate for use in disk drives. However, the low density of this material would likely yield an even lower surface roughness (Ra).

EPO Patent Application 0 131 895 reports a zirconia based magnetic disk substrate for use in disk drives. However, the best surface roughness (Ra) of any disclosed material is reported to be only 0.003 um (30 angstroms). JP 01112518 discloses a zirconia based magnetic disk substrate for use in disk drives. However, the surface roughness (Ra) of this material is reported to be only 5–8 nm (50–80 angstroms).

Accordingly, there is a need for a disk drive material possessing superior wear resistance, stiffness and polishablity.

SUMMARY OF THE INVENTION

In accordance with the present invention, there is provided a partially stabilized zirconia substrate (preferably in the form of a disk substrate for use in a disk drive), the substrate consisting essentially of partially stabilized zirconia and having a surface roughness (Ra) of no more than 1 nm (10 angstroms).

Also in accordance with the present invention, there is provided a disk substrate for use in a disk drive, the disk substrate consisting essentially of partially stabilized zirconia and having a textured surface.

Also in accordance with the present invention, there is provided a disk drive comprising: a) a head, and b) an underlying disk as disclosed above, wherein the in-use airgap between the head and the disk is no more than 50 nm (2 microinches).

Also in accordance with the present invention, there is provided a process comprising: a) polishing a partially stabilized zirconia substrate with a diamond or alumina paste to a finish of no more than 1 nm (10 angstroms).

DETAILED DESCRIPTION OF THE INVENTION

Figure 1:
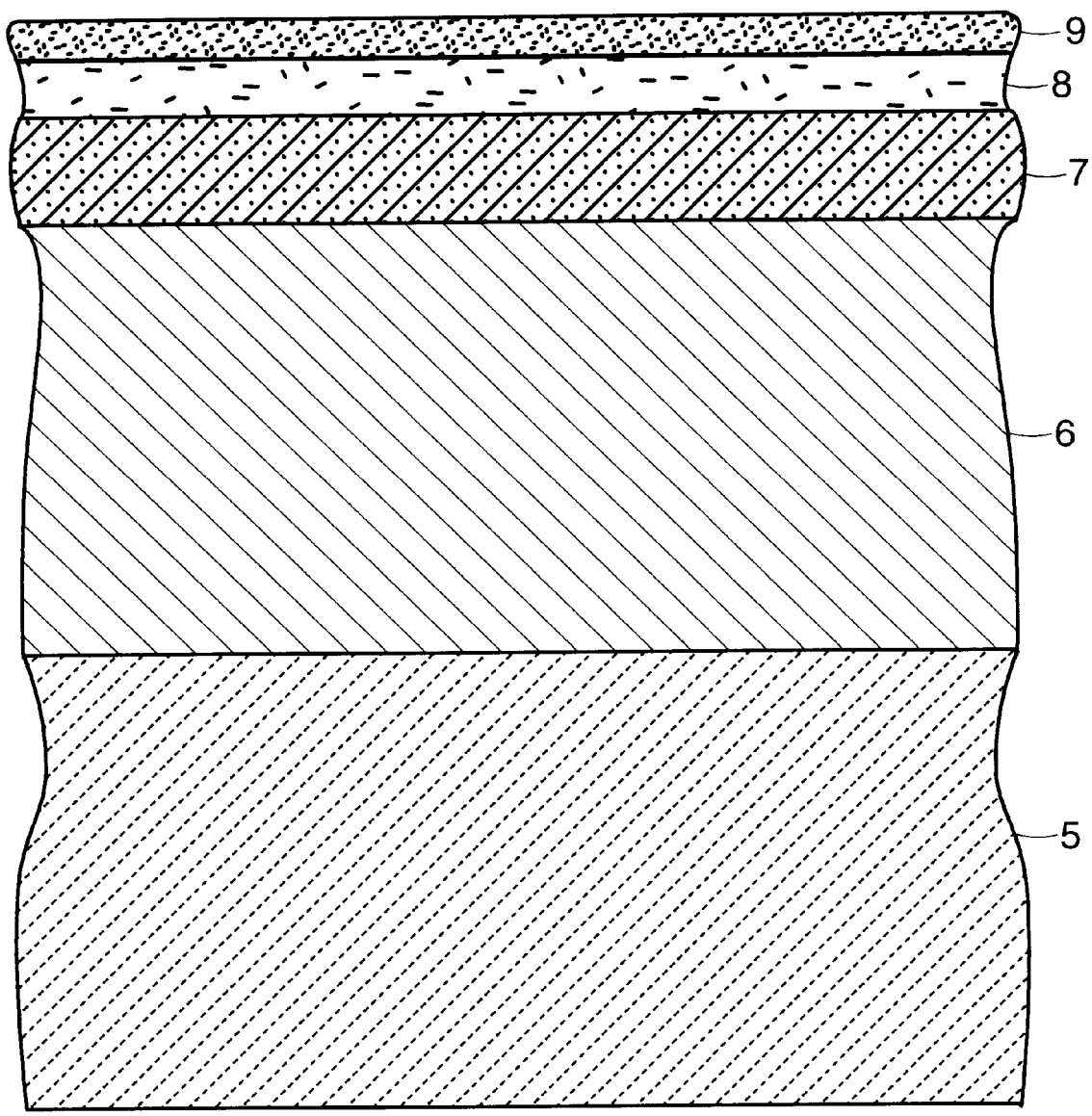
FIG. 1 presents a conventional disk.

It is believed that the most of the promising disk substrate candidate materials possess inadequate toughness or a too high surface roughness (Ra). In particular, they possess the following toughnesses:

| Substrate | Toughness (Mpa m$^{1/2}$) |
| --- | --- |
| 1) glass | 0.5–0.9 |
| 2) glass ceramics | 2 |
| 3) amorphous carbon | 1 |
| 4) silicon | 2 |
| 5) CVD Silicon carbide | 3 |

In contrast, it is believed that the toughness required for the thin disks of the future will be at least about 4 MPa m$^{1/2}$ and the surface roughness (Ra) requirement will be no more than 1 nm (10 angstroms). Without wishing to be tied to a theory, it is believed that high toughness is required in these future disk substrates because it affords superior machinability and damage tolerance, and the fine finish (low surface roughness) is required for increased recording density. Because partially-stabilized zirconia typically has a toughness of at least about 7 MPa m$^{1/2}$ and can now be made to have a surface roughness of no more than 1 nm (10 angstroms), it is believed that these materials will be required in the disks of the future.

For the purposes of this invention, "fracture toughness" is measured by the Chantikul indentation strength method as disclosed in the *Journal of the American Ceramics Society*, 64(9), 1981, pp. 539–44. (CITE); surface roughness Ra" is the universally recognized as the arithmetic mean of the departures of the profile from the mean surface; and grit sizes used in finishing refer to the average diameter of the grit.

Any conventional partially-stabilized zirconia ("PSZ") ceramic, such as yttria-partially stabilized tetragonal zirconia polycrystal ceramic ("YTZP"), may be used in accordance with the present invention. Typically, commercial partially-stabilized zirconias have at least about 30% (and often more than about 70%) tetragonal zirconia and a toughness of at least about 4.5 MPa m$^{1/2}$, preferably at least about 6 MPa m$^{1/2}$. Preferably, the zirconia is partially stabilized by a rare earth, and more preferably at a concentration of between about 2.5 mol % and about 6 mol %, as rare earth oxide, most preferably at a concentration of between about 2.5 mol % and about 4 mol %, as rare earth oxide.

In some embodiments, the zirconia is YZ110, an yttrium-stabilized zirconia available from the Norton Company of Worcester, Mass.

Any conventional method of making the zirconia disk substrate may be used. For example, in some embodiments, rare earth oxide powder and zirconia powder are mixed, the mixture is cipped (uniaxially or isostatically) at between 50 and 500 MPa to form a green piece; the green piece is sintered at between 1300° C. and 1500° C. for 0.5–4 hours to achieve a density of at least 95%; and the sintered piece is hipped in inert gas at between 1200° C. and 1500° C. for between 0.5 and 4 hours to achieve a density of at least 99.9%.

Most preferably, yttria powder and zirconia powder are mixed, cold-pressed, sintered to at least 96% density and hipped to at least 99.9% density.

In some embodiments, it is believed advantageous to have a highly pure disk substrate, that is, a substrate having less than 0.3% of impurity or sintering aid, especially if the impurity or sintering aid tends to form a second phase. Such typical sintering aids include silica, iron and manganese. It has been found that using YTZP powders, available from Daiichi Kigenso (DKK) of Osaka, Japan, without sintering aid produces a partially stabilized disk substrate having the desired levels of purity which can be finished to the desired levels of surface roughness (Ra). Accordingly, there is provided a partially stabilized zirconia disk substrate having no more than 0.3% impurity or sintering aid and a surface roughness of no more than 1 nm (10 angstroms).

In some preferred embodiments, it is believed advantageous to have no more than 0.1% porosity. It has been found that PSZ from commercially available DKK powders provides a partially stabilized disk substrate having no more than 0.1% porosity which can be finished to the desired levels of surface roughness (Ra).

Disk preparation generally involves only two steps: making a thin ceramic body and then finishing the body. Any conventional method of making thin ceramic bodies may be used in accordance with the invention, including diamond saw slicing of ceramic rods, tape casting, extrusion, and die pressing. Preferably, the thin disk substrates are made by slicing a ceramic rod with a diamond saw. The slicing should produce a disk having an Ra of between about 2–7 um and a thickness of less than about 1 mm, preferably less than about 0.5 mm.

Any conventional lapping method may be used to help attain the required finish on the disk substrate of the present invention, including lapping with a diamond paste or alumina. The lapping should produce a finish of less than about 12.5 nm (125 angstroms). In preferred embodiments, the polishing entails selecting either a diamond paste or alumina grain having an average size of between about 3 and 15 um, preferably less than 10 um.

It has been found that polishing the lapped disk substrate with a fine diamond paste or alumina produces a finish of less than about 1 nm (10 angstroms). In preferred embodiments, the polishing step uses diamond, alumina or a mixture thereof, having an average size of about 0.01 and 0.2 um, preferably less than 0.1 um.

Although a smooth disk surface is desirable for accuracy, it is often the case that disk substrates which are too smooth stick to the head. Accordingly, disks often require a surface texture. Any conventional method of texturing may be used, including thermal etching, laser etching, chemical etching and plasma etching, and combinations thereof. If thermal etching is selected to texture zirconia, the temperature of the etch is typically between about 800 and 1400° C., preferably about 1000° C. at about 30 minutes.

In other embodiments, zirconia toughened alumina may be used, preferably AZ67, available from the Norton Company of Worcester, Mass. It is believed that lapping and polishing commercial zirconia toughened alumina having a toughness of at least about 4.5 MPa m$^{1/2}$, preferably at least about 5 MPa m$^{1/2}$ as described above yields the desired finish.

In still other embodiments, boron carbide may be selected. If boron carbide is selected as the disk substrate, any conventional boron carbide ceramic may be used. It is believed that when boron carbide is either hot pressed or sinter-hipped, and then lapped and polished as above yields the desired finish. It typically has a modulus of elasticity of at least about 435 GPa. More preferably, the boron carbide also has a porosity of less than about 0.1% and a surface roughness (Ra) of no more than 1 nm (10 angstroms). In preferred embodiments, the boron carbide is Norbide, a hot-pressed boron carbide available from the Norton Company of Worcester, Mass.

COMPARATIVE EXAMPLE

A YZ110-H blank rod having a 3.81 cm (1.5") diameter and a 7.62 cm (3") length, available from the Norton Company of Worcester, Mass., was sliced with a diamond saw. The surface of this slice was subjected to a number of finishing steps including grinding, lapping and polishing steps.

In particular, the slice was first ground with a 320 grit diamond blank to produce a surface roughness (Ra) of about 0.110 um. Next, the lapped slice was serially lapped and polished with diamond on a 30.48 cm (12 inch) lapping machine according to the specifications set out in Table I below:

TABLE I

| Slice | Grit Size um | Wheel type | Speed rpm | Speed MPa | Pressure (psi) | Duration min | Ra um |
|---|---|---|---|---|---|---|---|
| A | 40 | alumina | 100 | 0.138 | (20) | 4 | 0.130 |
| B | 30 | platen | 25 | 0.173 | (25) | 3 | 0.028 |
| C | 9 | platen | 125 | 0.173 | (25) | 2 | 0.020 |
| D | 3 | texmet | 200 | 0.207 | (30) | 1.2 | 0.012 |
| E | 1 | cloth | 300 | 0.311 | (45) | 1.2 | 0.008 |
| F | 0.25 | cloth | 400 | 0.414 | (60) | <1 | 0.005 |

This test slice did not achieve the desired 0.001 um (10 angstrom) surface roughness (Ra).

EXAMPLE I

A YZ110-H blank rod having a 3.81 cm (1.5") diameter and a 7.62 cm (3") length, available from the Norton Company of Worcester, Mass., was sliced with a diamond saw into six slices A to F.

Slices E and F were sliced at a higher feed rate. The thickest and thinnest cross sections, as well as the surface roughness Ra of these six slices are presented in Table II. The surface roughness (Ra) was measured by TENCOR.

TABLE II

| Slice | cm | Thickest | cm | Thinnest | Ra (um) |
|---|---|---|---|---|---|
| A | 0.1021 | (0.0406 in) | 0.1021 | (0.0402 in) | 2–7 |
| B | 0.1046 | (0.0412 in) | 0.1029 | (0.0405 in) | 2–7 |
| C | 0.1021 | (0.0406 in) | 0.1019 | (0.0401 in) | 2–7 |
| D | 0.0511 | (0.0201 in) | 0.0493 | (0.0194 in) | 2–6 |
| E | 0.0546 | (0.0215 in) | 0.0495 | (0.0195 in) | 2–7 |
| F | 0.0597 | (0.0235 in) | 0.0559 | (0.0220 in) | 2–5 |

These slices were subjected to standard lapping and polishing steps, and then final-polished with a 0.05 um diamond paste to a surface roughness (Ra) of 1 nm (10 angstroms), as measured by TENCOR methodology. Lastly, one of the slices was textured by thermal etching at 1000° C.

EXAMPLE II

Two Daiichi powders (3 mol % Y-TZP and 4 mol % Y-TZP) were cipped at 200 MPa to form green rods, sintered in air at 1350° for 60 minutes to achieve at least 98% density, and hipped in argon at 1350° C. and 200 MPa for about 45 minutes to produce rods having a density of at least 99.9%.

These dense rods were then sliced into disks of 25.4 mm diameter and 0.8 mm thickness. Final finish grinding of these slices was undertaken with #500 grit resin bonded diamond wheels.

The ground disk blanks were lapped using 9 um alumina grit on a cast-iron lapping wheel having slurry continuously dripping from the wheel. Lapping took about 30 minutes and produced a surface roughness of about 12.5 nm (125 angstroms).

The lapped slices were then final-polished with a 0.05 um alumina/diamond paste to a surface roughness (Ra) of 1 nm (10 angstroms), as measured by TENCOR methodology.

EXAMPLE III

This example proceed substantially similarly to Example II, except that the lapping step used 9 um alumina only and the final-polish step used 50 nm alumina only. The resulting disk substrate had a surface roughness of about 1 nm (10 angstroms), as measured by AFM.

I claim:

1. A disk substrate for use in a disk drive, the disk substrate selected from the group consisting of partially stabilized zirconia and zirconia toughened alumina, the disk substrate having a surface roughness (Ra) of no more than 1 nm (10 angstroms).

2. The disk substrate of claim 1 consisting essentially of partially stabilized zirconia comprising between about 2.5 mol % and about 6 mol % rare earth, as rare earth oxide.

3. The disk substrate of claim 2 having an impurity level of no more than 0.3 weight percent.

4. The disk substrate of claim 2 having a porosity of no more than 0.1%.

5. The disk substrate of claim 2 wherein the partially stabilized zirconia comprises about 4 mol % rare earth, as rare earth oxide.

6. A disk drive comprising:

a) a head, and b) a disk comprising the disk substrate of claim 1, wherein the airgap between the head and the disk is no more than 2 microinches.

7. A process comprising the steps of:

a) lapping a disk substrate selected from the group consisting of partially stabilized zirconia and zirconia toughened alumina with a diamond or alumina paste, or mixture thereof, having a grit size of between about 3 um and 15 um to a surface roughness (Ra) of about 50–125 angstroms, and b) polishing the disk substrate with a diamond or alumina paste, or mixture thereof, having an average grain size of between 0.01 um and 0.1 um to a surface roughness (Ra) of no more than 10 angstroms.

8. A partially stabilized zirconia substrate consisting essentially of partially stabilized zirconia and having a surface roughness (Ra) of no more than 10 angstroms, the substrate produced by a process comprising the steps of:

a) lapping a disk substrate consisting essentially of partially stabilized zirconia with a diamond or alumina paste, or mixture thereof, having a grit size of between about 3 um and 15 um to a surface roughness (Ra) of about 125 angstroms, and b) polishing the disk substrate with a diamond or alumina paste, or mixture thereof, having an average grain size of between 0.01 um and 0.1 um to a surface roughness (Ra) of no more than 10 angstroms.

9. The process of claim 7 wherein the polishing paste consists essentially of diamond.

* * * * *